W. S. BARTON.
SEED-PLANTERS.

No. 195,743. Patented Oct. 2, 1877.

WITNESSES:
E. Wolff.
Alex F. Roberts

INVENTOR:
W. S. Barton
BY Munn & Co.
ATTORNEYS.

UNITED STATES PATENT OFFICE.

WILLIAM S. BARTON, OF ORANGEBURG, SOUTH CAROLINA.

IMPROVEMENT IN SEED-PLANTERS.

Specification forming part of Letters Patent No. 195,743, dated October 2, 1877; application filed July 9, 1877.

*To all whom it may concern:*

Figure 1:
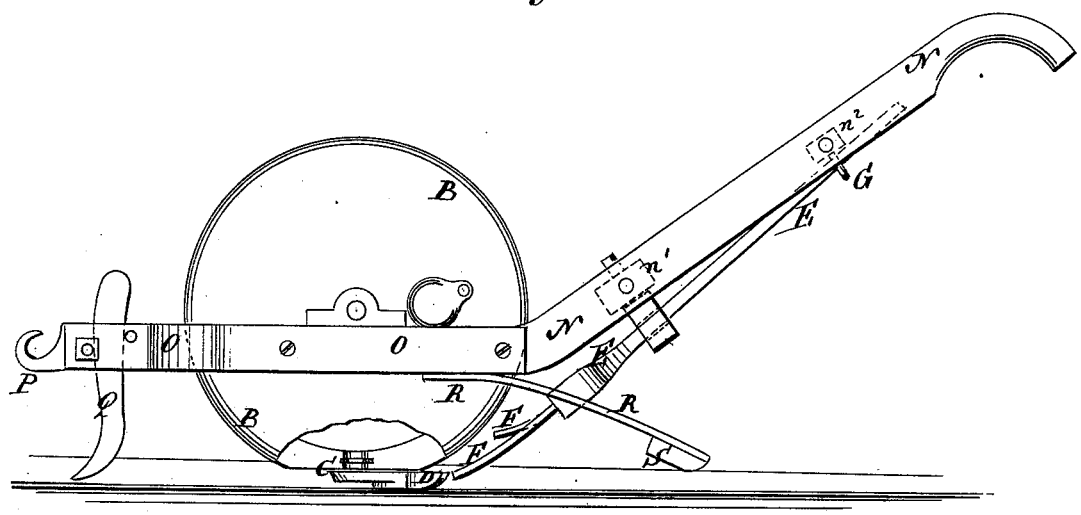
Figure 2:
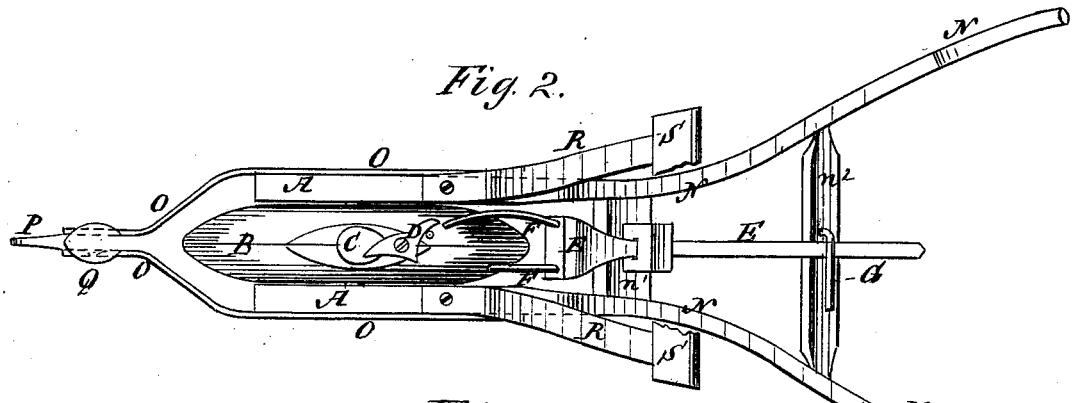
Figure 3:
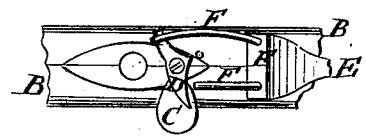

Be it known that I, WILLIAM S. BARTON, of Orangeburg, in the county of Orangeburg and State of South Carolina, have invented a new and useful Improvement in Seed-Planter, of which the following is a specification:

Figure 1 is a side view of my improved seed-planter, part being broken away to show the construction. Fig. 2 is a bottom view of the same, part being broken away to show the construction. Fig. 3 is a detail view of the valve and the device for opening and closing it.

Similar letters of reference indicate corresponding parts.

The object of this invention is to furnish an improved seed-planter which may be used for planting cotton-seed, corn, and other seeds, and which shall be simple in construction and convenient and reliable in use, planting the seeds uniformly.

The invention consists in the combination of the valve, provided with the double cam, the prongs of unequal length, the pivoted lever, and the open keeper with the wheel and with the rounds of the handle, as will be hereinafter more fully described.

A are the beams, which are made short, and the rear ends of which are attached to, or are extended to form, the handles, and to and between which is pivoted the dropping-wheel B.

The dropping-wheel B is designed to be made in the form of two concaved or cup-shaped disks, which are placed with their concave sides toward each other, and are connected together by bolts passing through them near their edges.

In the adjacent edges of the disks of the wheel B are formed one or more holes, which are closed upon the outer side by valves C, rigidly attached to or formed solid with the double cams D, which are pivoted to the wheel B, at the forward side of the dropping-hole.

E is a lever, which is pivoted to a cross-bar, $n^1$, attached to the lower part of the handles N, and to the lower end of which are attached two prongs, F. The prongs F are made of different lengths, and are so arranged that the end of the longer one will strike the cam D and open the valve C, just as the said valve begins to rise from the ground.

As the seed drops to the ground the shorter prong F strikes the cam D and closes the valve C.

The upper end of the lever E passes through an open keeper, G, attached to the upper cross-bar or round $n^2$ of the handles, so that the lever E can be turned to one side to move the prongs F into such a position that they will not strike the cam D, thus enabling the machine to be drawn from place to place without dropping seed.

When the seed is to be planted in drills, the valve (or valves) C is detached, the bolts of the dropping-wheel are loosened, wedges or blocks of the proper thickness are inserted between the edges of the disks of the wheel B, and the said bolts are again tightened.

The handles N are attached to or formed upon the rear ends of the beams A, and they are connected and held in their proper relative positions by rounds $n^1$ $n^2$ attached to them.

To the outer sides of the beams A are attached the rear ends of two bars, O, the forward ends of which are bent inward and forward, and to them is attached the draft-hook P.

To the forward parts of the bars O is also attached a tooth or plow, Q, to open a channel for the wheel B.

To the rear ends of the beams A are attached the ends of two spring-bars, R, which project to the rearward, curve downward, and have a block or plate, S, attached to their free ends, to scrape the soil into the channel and cover the seed.

Having thus described my invention, I claim as new and desire to secure by Letters Patent—

The combination of the valve C, provided with the double cam D, the prongs F of unequal length, the pivoted lever E, and the open keeper G, with the wheel B, and with the rounds $n^1$ $n^2$ of the handles N, substantially as herein shown and described.

WILLIAM SAMUEL BARTON.

Witnesses:
W. W. CULLEN,
A. C. DUKES, M. D.